Dec. 19, 1933.    A. M. ROBINSON    1,940,231
CHANGE MAKING MACHINE
Filed July 28, 1931    5 Sheets-Sheet 1
Fig. 1
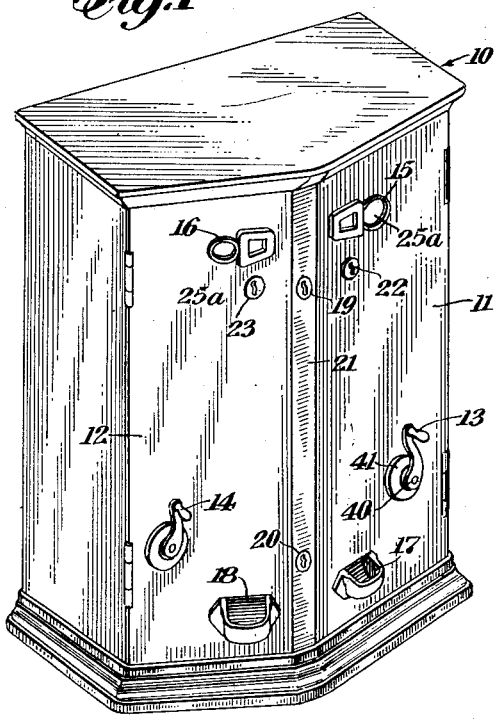
Fig. 3
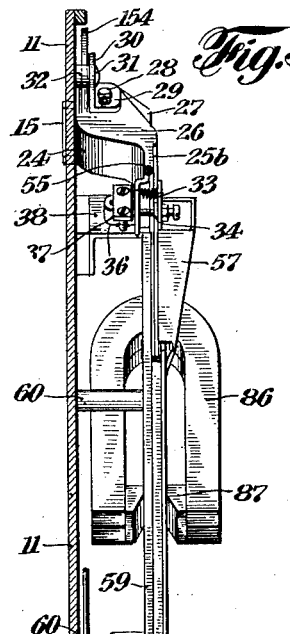
Fig. 4
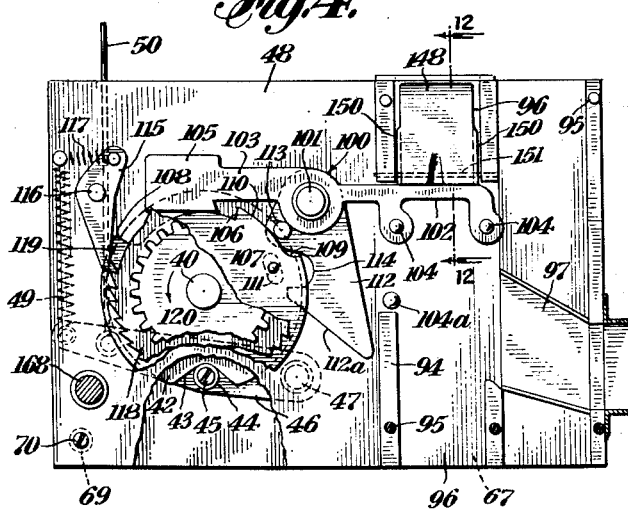
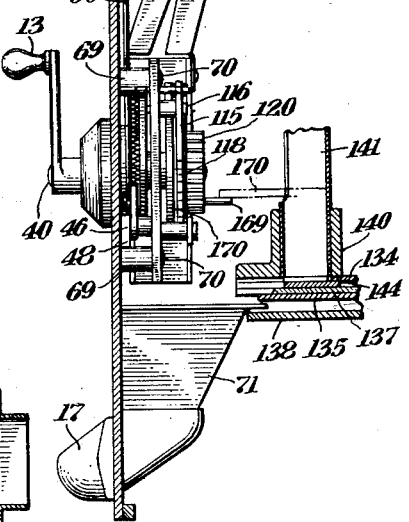
INVENTOR
Andrew M. Robinson
BY
Edwards, Bower & Pool
ATTORNEYS

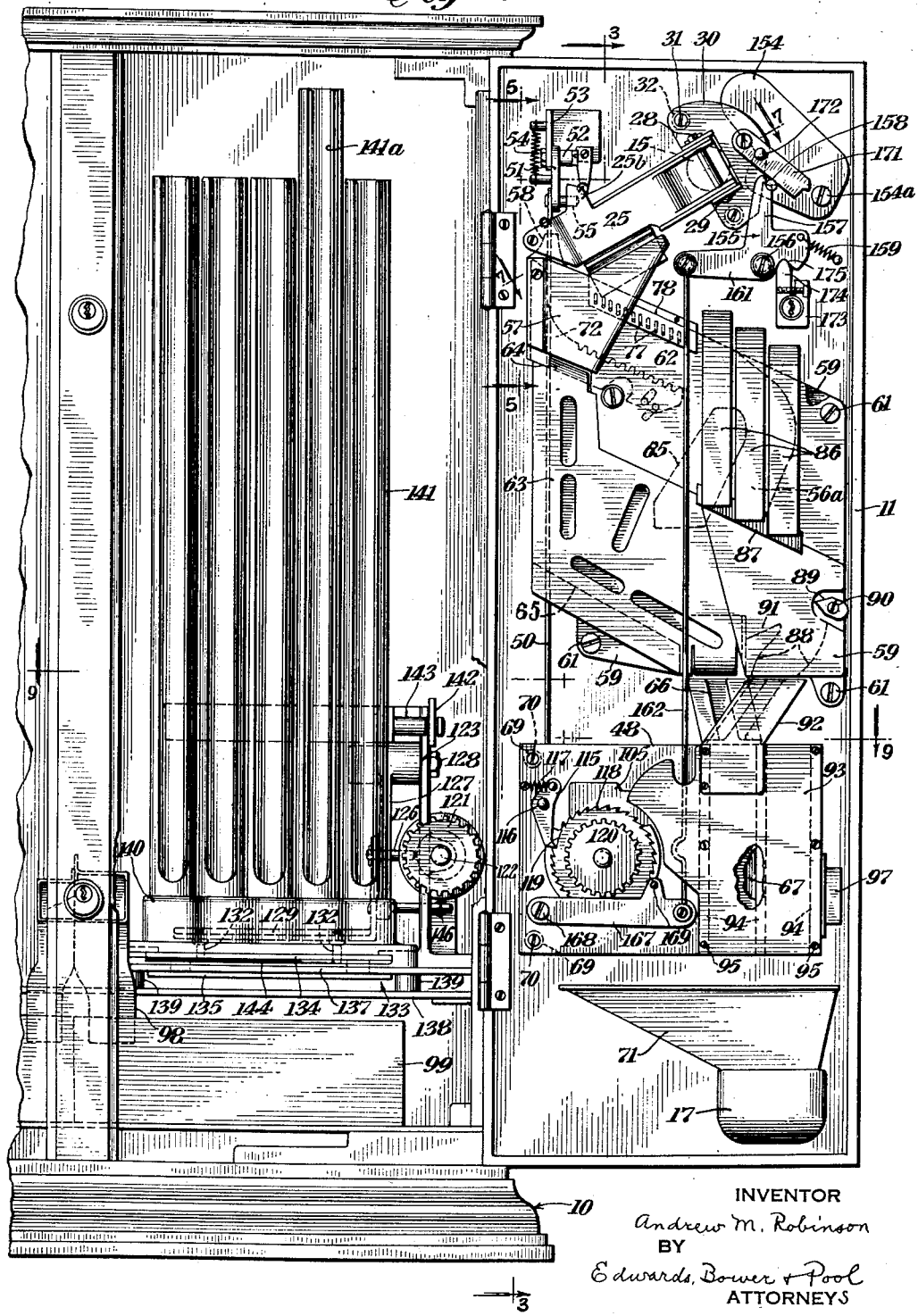

Dec. 19, 1933.        A. M. ROBINSON        1,940,231
CHANGE MAKING MACHINE
Filed July 28, 1931        5 Sheets-Sheet 3

INVENTOR
Andrew M. Robinson
BY
Edwards, Bower + Pool
ATTORNEYS

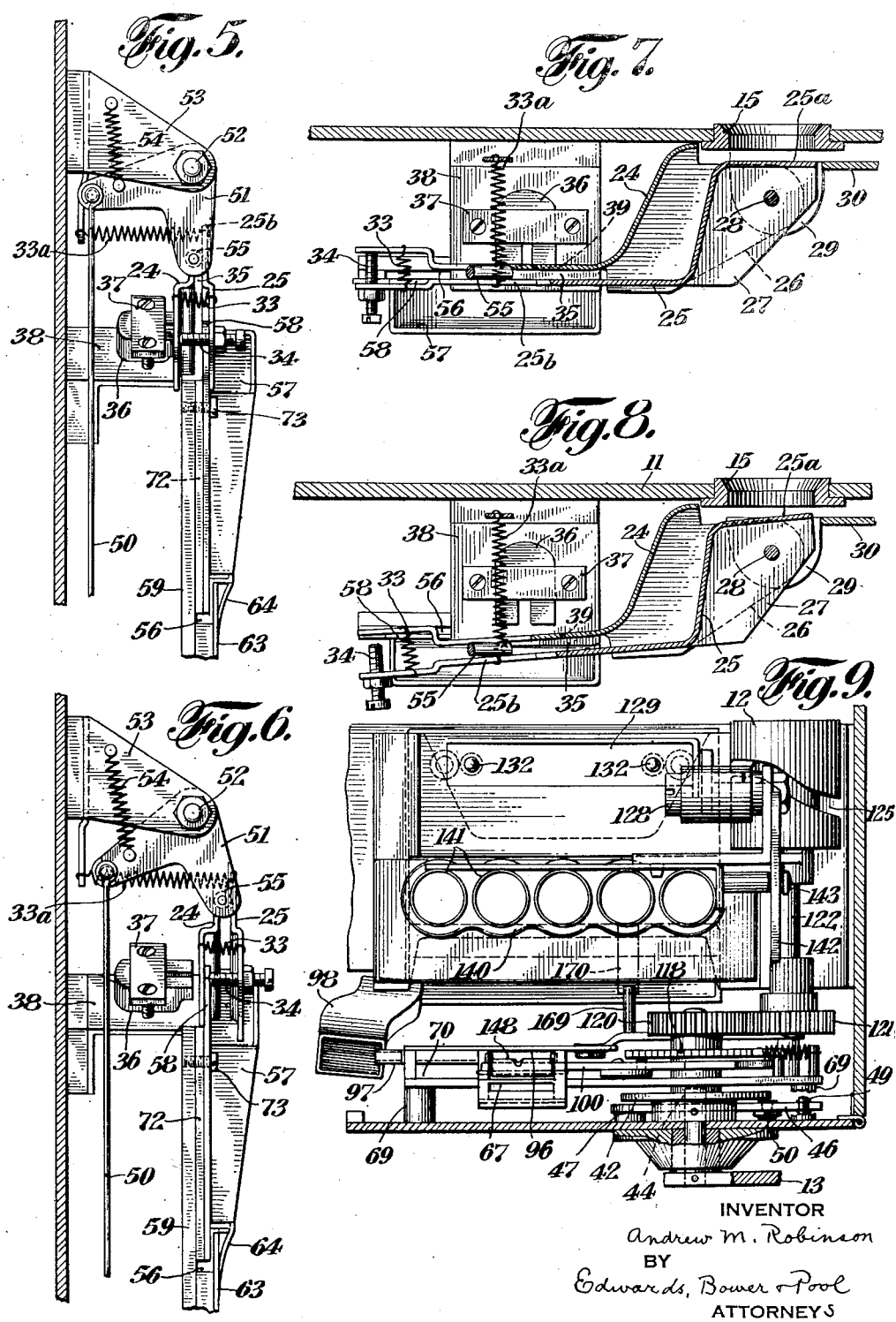

Dec. 19, 1933.  A. M. ROBINSON  1,940,231
CHANGE MAKING MACHINE.
Filed July 28, 1931  5 Sheets-Sheet 5
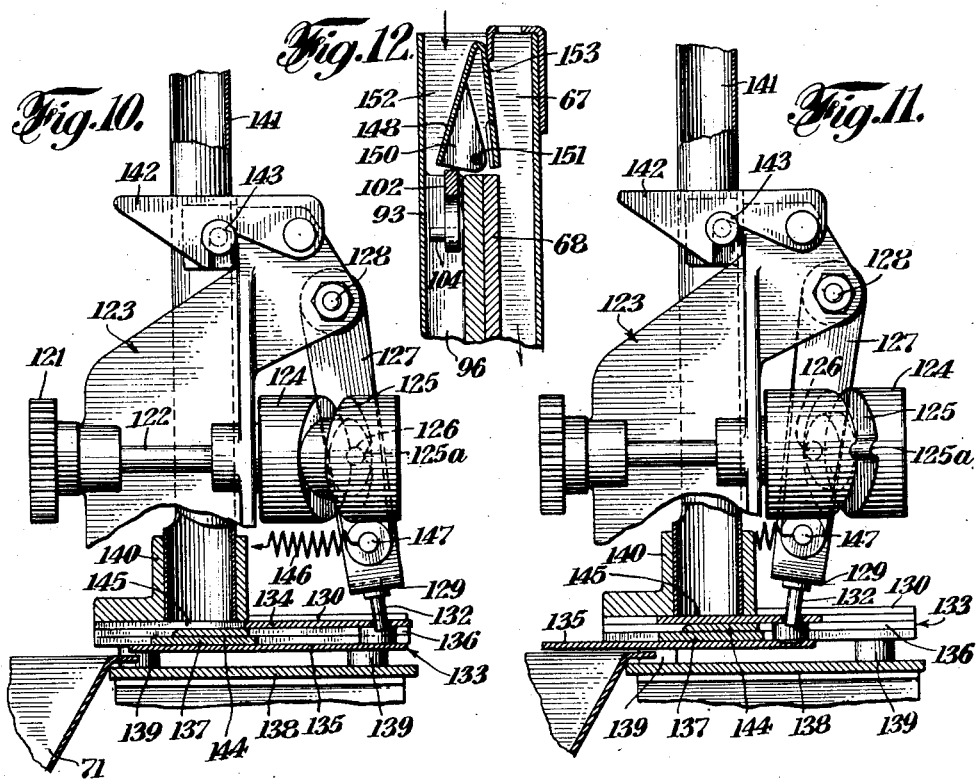
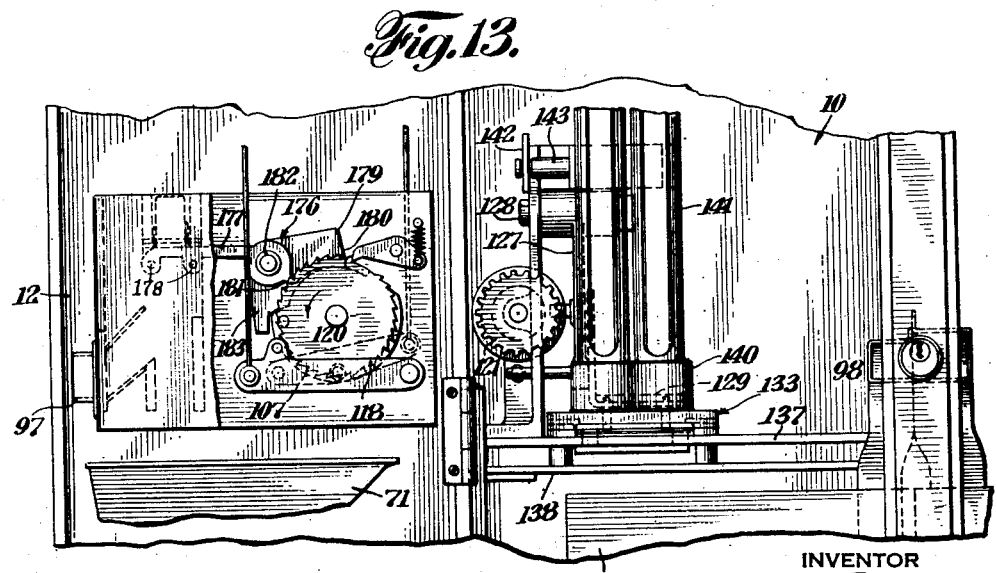
INVENTOR
Andrew M. Robinson
BY
Edwards, Bower + Pool
ATTORNEYS Patented Dec. 19, 1933

1,940,231

UNITED STATES PATENT OFFICE 1,940,231

CHANGE MAKING MACHINE

Andrew M. Robinson, New York, N. Y., assignor to Camco Scale Corporation, New York, N. Y., a corporation of New York Application July 28, 1931. Serial No. 553,582

12 Claims. (Cl. 194—97)

My invention relates to change making or change vending machines, and the general object of the invention is to provide a new and improved machine of this class.

A specific object of the invention is to provide a machine of the specified class comprising two or more units or mechanisms of the same general construction, but with their parts reversely or oppositely related so that one unit is operated by a hand-piece at the left side of the unit, the companion unit being operated from its right side, thus obtaining wide spacing to allow two persons to operate the machine at the same time without interfering with each other.

Another specific object is to provide that the said two units may supply change in different amounts.

A further specific object is to provide for operation of said right and left hand units by separate associate hand pieces adapted to be turned in the same direction.

A further object of the invention is to provide mechanism for eliminating defective coins, which is simple and certain in operation.

A further object is to provide a simplified connection between the parts of the mechanism mounted on the movable door of the cabinet or container and the parts mounted within the container, said connection comprising separable gears included in the operating train whereby the usual split-shaft connection is done away with.

A still further object is to provide an improved form of shut-off or locking mechanism for the machine, involving a closure for the coin slot which has a dual control, being operative by a locking key and also operative automatically when the supply magazines are exhausted.

A still further object of the invention is to provide an improved coin dispensing mechanism which is effective to eject the coins constituting the change by a gradual movement, minimizing noise and jerkiness.

To the above and other ends which will subsequently appear, the invention consists in the features of construction, combinations of devices, and arrangements of parts hereinafter described and particularly pointed out in the claims.

It will be evident to those skilled in the art that various features of the invention may be employed in vending machines of other types than the one herein shown.

The preferred form of the invention is illustrated in the accompanying drawings wherein Fig. 1 is an exterior perspective view of the machine as it appears with the cabinet in place;

Fig. 2 is an elevation of the right hand unit as it appears when its cabinet door is open;

Fig. 3 is a vertical fragmentary view on an enlarged scale taken on planes indicated by the broken section line 3—3 in Fig. 2;

Fig. 4 is an elevation on an enlarged scale of the coin-controlled mechanism mounted on the inside of the lower part of the door as shown in Fig. 2; certain overlying parts being omitted for the sake of clearness;

Fig. 5 is a vertical sectional view on an enlarged scale taken on the section line 5—5 of Fig. 2;

Fig. 6 is a view corresponding to Fig. 5 but showing the parts in operated position;

Fig. 7 is an enlarged fragmentary view taken on the plane indicated by the section line 7—7 in Fig. 2;

Fig. 8 is a view corresponding to Fig. 7, showing the parts in operated position;

Fig. 9 is a horizontal sectional view taken on planes indicated by the broken section line 9—9 in Fig. 2 but with the door closed instead of open as in Fig. 2;

Fig. 10 is a fragmentary vertical view, partly in sections, showing one of the coin ejecting mechanisms;

Fig. 11 is a view corresponding with Fig. 10 but showing the parts in operated position;

Fig. 12 is a fragmentary vertical sectional view on an enlarged scale taken on a plane indicated by the section line 12—12 in Fig. 4;

Fig. 13 is a fragmentary elevation showing the lower portion of the unit at the left hand side of the machine with the door open;

Figure 2A:
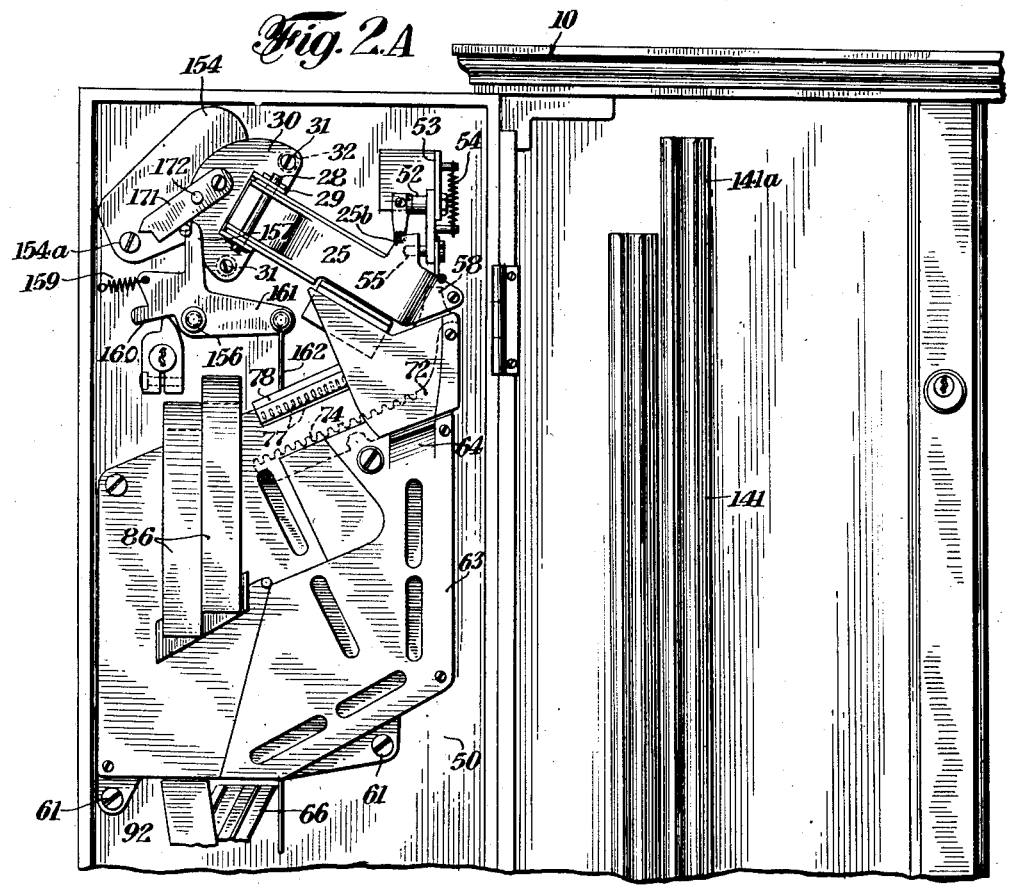
Fig. 2a is a corresponding fragmentary view of the left hand unit.

The machine as herein illustrated comprises two change making units or mechanisms, the one at the left being for dimes and the one at the right for quarters. The units are mounted in a cabinet or container (Fig. 1), indicated generally by the numeral 10, the sides and doors of which are preferably of pressed metal, suitably secured to a cast base and top. The doors 11 and 12 are hinged at their outer side edges so that when opened they swing outward away from each other. As shown, the doors are angularly related, being inclined from their hinges towards each other at an obtuse angle. This adds to the appearance of the machine as a whole but the main purpose is to afford more room for customers to operate the two change making units independently of each other at the same time. The right hand, or quarter unit, is operated by a finger piece or rotary handle 13 mounted on the door 11, and the left hand unit is operated by a finger piece or rotary handle 14 mounted on the door 12. These finger pieces are, it will be noted, disposed as far apart as is possible near the hinges of their respective doors so as to facilitate separate simultaneous operation of the two units. The coins in the present instance, quarter dollars, for operating the right hand unit are inserted in a coin slot 15 in the door 11 and the dimes for operating the left hand unit are inserted in a coin slot 16 in the door 12. Slugs or false coins are returned to coin cups 17 and 18 mounted respectively on doors 11 and 12. Doors 11 and 12 are adapted to be locked by detachable keys applied to the key hole slots indicated at 19 and 20, these slots being in slot pieces mounted on the front center bar 21 of the cabinet. The same detachable keys are adapted to be applied to key hole slots 22 and 23 for the purpose of locking the respective closures of the coin slots or openings 15 and 16 as hereinafter described.

The coin magazines of the two units are mounted within the body of the cabinet 10 while the associate units themselves are mounted on the insides of the doors 11 and 12. Each unit comprises in general three mechanisms: first, an eliminating mechanism for steel or iron and malformed slugs mounted near the top of the door; second, eliminating mechanism for slugs of improper silver content mounted near the middle of the door; and third, coin controlled releasing or unlocking mechanism mounted near the bottom of the door. It will be understood that these are merely general divisions and that parts of the mechanisms for performing these various functions may overlap. For example, while I have preferred to incorporate with the mechanism for eliminating bent or too-thick slugs the mechanism for eliminating slugs with defective rims, I have in the present instance, shown the latter mechanism associated with the middle mechanism for eliminating slugs of incorrect silver content.

Considering the units as a whole it is to be observed that generally the parts constituting them are substantially duplicates but that they are made as right hand and left hand units. This will be clearly apparent from inspection of the drawings, and particularly Fig. 2, which shows the right hand unit with associated coin magazine and Figs. 2a and 13 which show the left hand unit. The chief purpose of making the units as right hand and left hand mechanisms is to spread their operating handles or finger pieces as far apart as possible. This result has been achieved by means hereafter described and claimed. To avoid undue expansion of the specification the right hand or quarter-changing unit only will be described and explained in detail, it being understood that the left hand unit has corresponding parts which function similarly, these parts, except as hereinafter specified, differing only in that they are left hand instead of right hand parts.

A mechanism for arresting and discharging a false coin made of iron or steel or that is malformed or misshapen or unduly thick will first be described, reference being had particularly to Figs. 2-8, inclusive. When a coin is inserted in the coin slot member 15 it will pass rightward and downward between the walls 24 and 25 of a movable chute. This chute is not only movable as a whole but its walls or leaves are also relatively movable in respect of each other. The forward or front wall 24 is provided with parallel ears 26 which embrace the side edges of the opposite wall 25, said wall in turn being provided with ears 27 embraced between the ears 26 of the wall 25 as best shown in Fig. 7, its foremost portion 25a constituting an abutment or stop for the coin introduced into the slot member 15. The ears of the leaves of the chute are perforated to receive a pivot pin 28 which is supported at its ends in the ears 29 of a bracket 30 which is secured by screws 31 to studs 32 projecting from the inner face of the door 11, whereby the bracket 30 is spaced from the door. The two walls 24 and 25 are constantly pulled towards each other by a draw spring 33 which tends to maintain an adjustable stop 34 carried by the wall 25 in contact with the wall 24, the adjustment being such as to afford a free passageway for a normal or true coin through the space 35, between the walls but to arrest and hold a coin that is bent or too thick. The wall 25 is provided with an upward extension 25b to which is secured one end of a coil spring 33a having a stationary anchor which tends to draw the chute as a whole forward towards the door 11 about the pin 28 as an axis.

A permanent or horseshoe magnet 36 is clamped by a plate 37 to a bracket 38 secured to the door 11, the poles of said magnet projecting through an opening 39 in the wall 24 so as to attract and hold an iron or steel coin passing through the passageway 35.

The movements of the chute 24, 25 about its pivot are controlled by the finger piece or handle 13 so that an initial movement of said handle will communicate movement to said chute. Said finger piece is in the form of a crank arm secured to the outer end of a shaft 40 that bears in a boss or plate 41 secured to the door 11. The shaft 40 extends through the door and inside the door has mounted on it a disc 42 provided with a notch or depression 43 in which is normally seated a roller 44 carried by a pin 45 that projects from an arm 46 pivoted on a pin 47, carried by a plate 48 that is suitably secured to the door 11 and spaced from the inner face thereof, the disc 42 and the arm 46 being disposed in the space between said plate and said door. The arm 46 is constantly urged upward by a coil spring 49 connected to its outer end and anchored to the plate 48. The arm 46 is connected by an upwardly extending link 50 to a bell crank 51 pivoted at 52 to a bracket 53 secured to the inner face of the door 11, said bell crank being disposed at right angles to the door and being provided with a coil spring 54. One arm of the bell crank carries a pin 55 which projects behind the extension 25b of the wall 25 of the chute 24, 25.

Normally the passage 35 of this chute is in alignment at its lower end portion with a succeeding true-coin passageway or chute 56 so that a true coin may pass through the passage 35 without interruption into the passageway 56, but a coin arrested in the passageway 35 will be expelled from the machine by the described construction as follows.

Normally the roller 44 is seated in the notch 43 but during the initial turning of the finger piece 13 the corresponding turning communicated by it to the disc 42 in the direction of the arrow in Fig. 4 will cause the side of the notch 43 acting as a cam on the roller 44 to swing downward the crank arm 46 about its pivot 47. This will communicate a downward pull to the link 50 which will be transmitted to the bell crank 51 causing the pin 55 thereon to swing rightward as viewed in Fig. 5, and pressing against the extension 25b to overcome the spring 33a and swing the chute 24, 25 as a whole about its pivot 28. This swinging movement of the chute will carry its lower open end out of alignment with the true-coin passageway 56 and into alignment with the upper end portion or mouth of a discharge passageway 57 where the wall 24 will be arrested by contact with an upward projection 58 from the inner wall of said passageway.

However, the opposite wall 25 will be free to continue its pivotal movement by reason of the pressure against it of the pin 55, the result being that the walls will be relatively spread or separated, freeing the coin or slug retained in the passageway 35 and permitting it to drop into the discharge mouth 56 whence it will pass downward into the discharge cup 17. The releasing position of the chute is shown in Figs. 6 and 8. It will be understood that the spreading of the chute walls will release not only coins held or wedged between them by reason of overthickness or irregularity of shape but also coins that have been held by the permanent magnet 36.

The passageways or chutes 56 and 57 are in part constituted by the main support of the mechanism for separating coins according to their paramagnetic values, whereby the true coin is eventually selected for releasing the change making mechanism for operation. Said main support is constituted by a plate 59 which is secured to lugs or studs 60 projecting inward from the door 11 by screws 61 whereby the plate 59 is spaced therefrom. The mouth portion 57 is part of a supplemental plate 62 secured to the main plate 59 and spaced therefrom to provide various passageways or chute openings. Below the supplemental plate 62 a second supplemental plate 63 is similarly secured to the face of the main plate 59 and spaced therefrom. The upper left hand end portion of the plate 63 is flared as indicated at 64 to communicate with the mouth 57 so that coins released by the chute 24, 25 will drop downward between the plates 59 and 63 and roll rightward, as viewed in Fig. 2, along the top edge of a spacing strip 65, between the two plates, being thence guided into an out-chute 66 mounted at the lower edge portion of the plate 59. The out-chute 66 communicates with a vertical chute 67 on the plate 48 which is the main plate or support of the coin controlled mechanism hereinafter described.

The plate 48 is secured to lugs 69 by screws 70, said lugs projecting from the inner face of the door 11 near its lower side so that the plate 48 is spaced from the door. The chute 67 is disposed back of the plate 68 and between it and the inner face of the door 11. From the chute or passageway 67 the coins to be discharged drop into a flaring receptacle 71 secured to the inner face of the door 11, the lower end of said receptacle communicating with the coin cup 18.

Figures 14, 15:
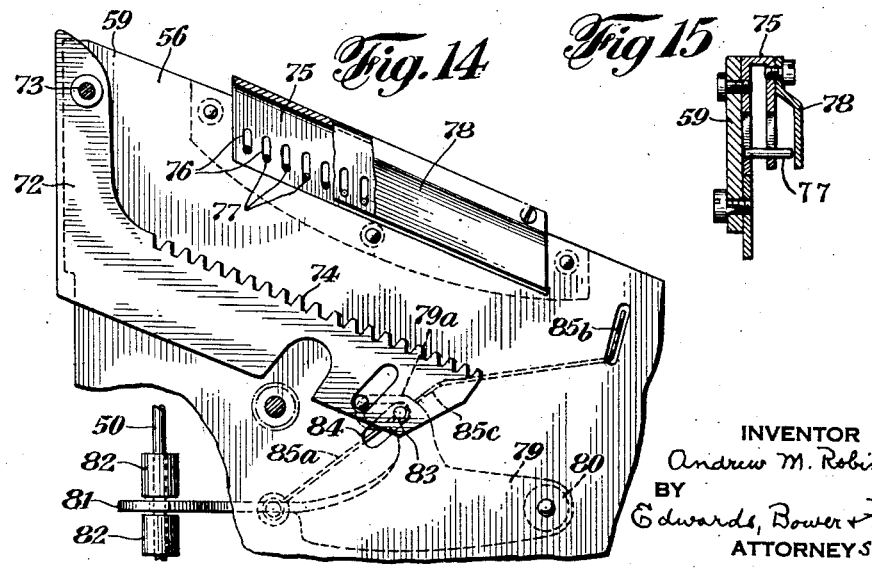
Figs. 14 and 15 are fragmentary elevations of the mechanism for eliminating notched coins.

Coins that pass freely through the mechanism for testing devices for thickness, comprising the chute 24, 25, enter the passageway or chute 56 between the plates 59 and 62 and are next subjected to devices for testing for notched coins, in which general term I include coins having any imperfection of rim. As has been stated I prefer to incorporate the rim testing devices with the thickness testing devices but in the present instance, as shown, the rim testing devices are mounted on the plate 59. As best shown in Figs. 14 and 15 the rim testing devices comprise an angular arm 72 disposed between the plates 59 and 62 and having its inner edge portion constituting part of the passageway 56. The arm 72 is pivoted at its upper end at 73. The upper edge of its rightward arm is roughened or serrated as indicated at 74, this being for the purpose of insuring that coins passing over it through the passageway 56 will roll and not slide. Secured to the plate 59 above the serrated portion 74 of the arm 72 is a channel bar 75 which is inclined to conform with the serrated edge 74 and is provided with a series of closely spaced vertical slots 76 in both of its parallel portions. In these slots are freely mounted cross pins 77 which are normally retained at the bottom of the slots 76 by gravity. Sidewise displacement of these pins is prevented by a cover plate 78.

The distance between the pins 77 and the serrated edge 74 is less than the diameter of a true coin so that as such coin rolls along the bottom 74 of the passageway 56 it will successively lift slightly the pins 77, these being so light that they will not exercise any material retarding effect on the rolling coin. However, should the coin have a notch, depression, or other imperfection in its rim, this portion will not lift the pins 77 which will then cooperate with the serrated bottom 74 to arrest the imperfect coin. The length of the bottom 74 and of the series of pins 77 preferably slightly exceeds the circumference of a coin in length so that assurance is had that at some point in its rolling passage an imperfect coin will be arrested.

Notched coins thus retained are released on an initial turning movement of the finger piece 13 through connections to the link 50. Said connections comprise a lever arm 79 pivoted to the back of the plate 59 at 80 and having a forked free end portion 81 which loosely embraces the link 50 and is confined therebetween by collars 82. The arm 79 has a pin and slot connection 83, 84 with the arm 72 so that when the link 50 is pulled down during initial operation of the handle 13, it will swing down the arm 79 which in turn will swing downward the arm 72, thereby releasing any coin locked or retained by the pins 77. Such coin on being released will strike a projecting ledge 85 on the plate 59 and will be caused thereby to drop against the strip 65 whence it will pass downward into the coin cup 18, following the same course as the over-thick coins.

To insure that the notched coin when released will be forced down to engage the ledge 85, stop devices may be provided in the form of a spring arm 85a secured behind the plate 59 and extending in a generally horizontal direction therealong, the free end 85b of such spring arm being in turn adapted to pass through the opening in the plate but being normally held in retracted position behind the surface of the plate by a projection 79a on the arm 79 which engages a bend 85c in the spring arm acting as a cam to retract it but permitting it to move forward and project the stop portion 85b when the notched coin is released.

Next the coins are subjected to tests for their paramagnetic qualities by means comprising, as herein shown, a set of permanent magnets 86. Three such magnets are shown for the quarter unit of the machine. For the dime or left-hand unit which requires a magnetic field of less intensity only two magnets 86 are shown. It is to be understood, of course, that the number of individual magnets may be varied to suit requirements. Returning now to the three magnets 86 associated with the right hand unit of the machine, these are vertically disposed and embrace the plate 59. To their lower ends are secured pole pieces 87 whose inner faces are spaced apart to afford a passageway for coins between them. Such coins drop downward through an extension 56a of the passageway 56. The walls of the extension are constituted by the plates 62 and 59 and the side edges by projecting portions of the plate 59.

The effect of the eddy currents set up in the magnetic field between the inclined pole pieces 87 is such that a true coin passing between them will be so influenced that it will take a downward course carrying it into the passageway 88 between the plates 59 and 63. A fine adjustment to insure this result is obtained by means of an abutment 89 which may be accurately set by means of a screw 90. Coins less affected by the eddy currents, such as brass and white metal, will take a more direct downward course between the pole pieces and striking the ledge 91 will be caused to enter the out-chute 66, thence dropping through the chute or passageway 67 and into the coin cup 18. On the other hand, coins such as those of copper and the like, being more affected by the eddy currents will be deflected rightward of the passageway 88 and striking the abutment 89 will be deflected leftward over the passage 88 on to the ledge 91, thence following the course described above in connection with brass coins.

False coins or slugs of different sorts having all been eliminated by the various testing means, as has been described, the quarter dollars for operating the machine will pass downward through the chute 88 into an extension 92 which is attached to and projects upward from a plate 93 spaced from the plate 48 by ribs or spacing strips 94 and secured thereto by screws 95. The extension 92 leads into a vertical passageway or chute 96 constituted by the plates 48 and 93 and two of the ribs 94. This passageway communicates at its lower end with the receptacle 71 leading to the coin cup 18 at its right, as viewed in Figs. 2 and 4, with a lateral extension 97 which when the door is closed communicates by way of a supplemental chute 98 with the coin box 99 within the cabinet.

The operating handle 13 is normally locked against operation by means which are automatically controlled by the true coin which enters the passageway 96, said coin operating to automatically release the locking means. Said means, as will be understood by reference to Figs. 2, 3, 4 and 9, comprises a coin operated lever 100 which is horizontally disposed between the plates 48 and 93, having a stationary pivot 101 from which its arms 102 and 103 extend oppositely.

The ribs 94 are cut away so that the arm 102 may extend within and move freely downward and upward in the passage 96. Arm 102 carries pins 104 spaced apart a distance less than the diameter of the quarter dollar so that they will arrest such a coin which will be supported by them but will allow a coin of lesser diameter to pass between them without affecting the lever 100. The arm 103 of said lever is heavier than the arm 102 and is provided with a detent or pawl 105 which normally lies in the path of a coacting face 106 on a disc 107 which is fixed to the shaft 40 between the plates 48 and 93. Detent face 106 forms one end of a cutout or notch in the disc 107, the opposite end terminating in a face 108 which connects the notch or depressed portion with a full portion of the disc that extends through the greater part of its periphery, terminating at the opposite side in a face 109 which connects with a portion 110 that terminates at the face 106.

One face of the disc is provided with a boss or dwell 111 which is adapted to cooperate with the arm 112 which extends downward from the pivot 101, said arm 112 being rigid with the lever 100. The arm 112 carries pin 113 and is provided with a cutout 114. Normally the detent faces 105 and 106 are related as shown in Fig. 4, thus permitting an initial turning of the handle 13 which, as has been explained, effects the operation of the testing devices for mutilated and notched coins. The initial movement of the handle will be terminated by a contact of the detent faces 106 and 105 and the mechanism will remain locked against operation unless a true quarter dollar has been inserted and been arrested by the pins 104 on the lever 100, in which case said lever will be rocked to lift the detent 105 out of the path of the detent 106, thereby permitting an operative rotary movement of the handle 13.

The disc 107 and the arm 112 are provided for insuring proper operation of the coin control lever 100. After the lever has been initially rocked by the weight of the coin resting on the pins 104, rotation of the disc 107 by the finger piece 13 will cause the face 109 to act as a cam on the pin 113, further rocking the lever arm 112 downward and bringing the coin which it carries into contact with a pin 104a which will act to force the coin off the pins 104 and into the lateral chute 97. The outer peripheral surface of the disc 107 acting on the pin 113 will maintain the lever 100 in its coin releasing position until rotation of the parts brings the face 108 of the disc into contact with the pin 113 which will permit lever 100 to return to its normal horizontal position by reason of the counter weight of the arm 103. However, in order to insure return movement of the lever in case of sticking or the like, means are provided comprising the boss or dwell 111 which acting against the lower inclined face 112a of the arm 112 will cam it rightward about its pivot 101 as viewed in Fig. 4, and at the same time return the lever 100 to normal. The notch or depression 114 in the arm is normally opposite the boss 111 and will permit initial movement of the lever 100 from normal position as has been described.

Backward rotation of the mechanism is prevented by a locking pawl 115 pivoted at 116 to the plate 48 and maintained by a draw spring 117 in engagement with a ratchet wheel 118 mounted on the shaft 40. The ratchet wheel is provided with a short cutout 119 to permit return movements of the parts after an initial operation of the handle 13, should it not be followed by a complete operation.

The parts of the coin controlled mechanism above described, are mounted on the inner face of the door 11 and are adapted to be connected with the change making mechanism mounted within the cabinet by means of a spur gear 120 which is fixed to the end portion of the shaft 40. Said spur gear when the door is closed meshes with a corresponding spur gear 121 which is shown in Figs. 2–4, 9–11, mounted at the forward end of a shaft 122 that is horizontally disposed at the right hand side of a casting generally designated by the numeral 123, the shaft taking bearings in lugs projecting from the casting. The rear end of the shaft 122 is provided with a barrel 124 that is formed with a closed cam 125 which operates the coin changing or ejecting mechanism proper.

The coin changing mechanism is operated from the cam 124, 125 by a pin 126 which engages in the cam slot 125, said pin projecting laterally from an arm 127 which is pivoted at 128 to the casting 123. Normally the pin 126 engages in a notch or dwell 125a which serves to center the cam and maintains the gear wheel 121 in a set normal position. This insures that the gear wheel will accurately re-engage with the gear wheel 120 when the door 11 is closed, since the gear wheel 120 is correspondingly held in predetermined position by the cooperation of the roller 44 and the dwell 43 in the disc 42. The arm 127 has fixed to its lower end portion a horizontally extending cross bar or arm 129.

Pins 132 projecting downward from the arm 129 engage loosely in holes in a slidable ejecting device indicated as a whole by the numeral 133. Said device comprises a top plate 134 and a bottom plate 135, the two being spaced apart by spacing members 136 and loosely embracing between them a stationary plate 137, which is attached to or forms a part of the casting 123, said casting being fixed to a cross plate 137 secured to the sides of the cabinet, the plate 137 being spaced upward therefrom by a spacer 139.

Operative rotation of the handle 13 will be transmitted through the shaft 40 and the connecting spur gears 120 and 121 to the shaft 122 and thence to the cam member 124, 125 which through the arm 127 and pins 132 will effect a reciprocation of the ejector to eject coins from the coin magazine, the ejector during its reciprocation or back and forth sliding movements being guided and controlled by suitable guides 130 on the plate 137.

The coin magazines which are detachably mounted within the cabinet or casing comprise each a base 140 which supports a plurality of upright coin tubes 141. For the right hand unit five coin tubes are shown and for the left hand unit, two coin tubes 141 are shown, the right hand unit dispensing five nickels in exchange for a quarter and the left hand unit two nickels in exchange for a dime. The magazine is suitably centered on the base plate 137 and is locked in position by a pawl 142 which is carried by the casting 123, said pawl engaging with a headed pin 143 projecting from the side of the magazine. Stacks of coins in the tubes 141 normally rest on a cross plate 144 carried by the magazine and spaced below the bottoms of the tubes as indicated at 145, this space being substantially corresponding to the thickness of a nickel. In other words, the bottom nickel in each stack is free to be pushed forward by the top plate 134 of the ejector, which as shown in Fig. 10, is normally slightly behind the coin tubes. As the ejector is slid forward it will eject five nickels which will fall on the bottom ejector plate 135, the forward end portion of which extends beyond the top plate 134. On the return movement of the ejector the nickels resting on plate 135 will be engaged by the stationary plate 137 and so held from backward movement, with the result that on full return of the ejector said nickels will fall into the receptacle 71 and thence into the coin cup 18.

A coil spring 146 having a stationary anchorage at one end and hooked at its opposite end over a pin 147 on the arm 127 takes up lost motion between the pin 126 and the cam slot 125 and conduces to smooth and noiseless operation of the mechanism.

Means best shown in Fig. 12 are provided for insuring the return of a second quarter dollar which may have been inserted immediately following the first and either prior to or during the operation of the mechanism. Such means comprises a member or plate 148 bent to generally triangular shape so as to present inclined contact faces at its opposite sides for coins. The narrow end of said member is uppermost and it is disposed in the upper part of the chute 96. The plate 148 has extensions or ears 150 which receive a pivot pin 151 near their lower ends. The bottom edge portions of said ears normally rest on the arm 102 of the coin controlled lever which maintains the plate in the position shown in Fig. 12, from which it will be seen that one face of the plate 148 cooperates with a face of the plate 93 to provide a tapering passageway, indicated at 152, through which the coin falls on the pins 104. When the lever arm 102 is depressed by the weight of the coin resting on the pins it will free the plate 148, the weight of which is so adjusted that the plate will swing on its pivot 151 over against the plate 93, thus closing the passage to the pins 104 and unclosing the opening 153 into the passage 67 from which the subsequently inserted quarter will fall into the coin cup 18.

Means are provided to prevent the insertion of coins in the coin slot 15 when the coin magazine becomes exhausted. Said means, shown in Figs. 2 and 3, comprise a target or plate 154, pivoted to the inside of the door 11 at 154a and normally above the slot opening 15, in ineffective position. The target 154 is maintained in this position by a three-arm lever 155 pivoted to the inside of the door at 156. The upright arm 157 of said lever is formed with a notch or slit which engages a pin 158 projecting from the target thus holding the latter in elevated nonworking position. A spring 159 connected to the arm 160 of the lever 155 tends to maintain the pin 158 locked. The third arm 161 of the lever 155 is connected by a downwardly extending link 162 to an arm 167 pivoted to the lower part of the door at 168. Said arm 167 carries a pin 169 which is adapted to be operated on by a follower 170 in one of the coin tubes 141. Said follower rests on the top coin of the coins in the tube and has a part which projects outward through the usual slit 141a therein. When the coins are exhausted the follower contacting with the pin 169 depresses the arm 167, lowers the link 162 and drops the lever 155, thereby releasing the pin 158 and permitting the target 154 to fall of its own weight and close the slot 15 against introduction of a coin.

At the same time a pivoted detent 171 will fall into position to engage the pin 158 so as to prevent the target from being pushed up to inoperative position from outside the machine. After the target is operated it can only be released by unlocking the machine and pushing the detent 171 out of locking position by hand, this being conveniently effected by a finger piece 172.

Sometimes it is desired to close the machine against operation before the coin magazine is exhausted and I have, therefore, provided a second means for releasing the target and closing the coin slot. This second means is operated by the detachable key which is applied to the keyhole slot 22, and comprises an arm 173 which is rotatable by the key, said arm being provided with a finger 174 which normally engages in a notch 175 in the lever arm 160. This notch is in effect a cam and when the finger 174 is rotated by the detachable key towards the right, as seen in Fig. 2, the arm 160 will be cammed thus rocking the lever 155 and releasing the pin 158, permitting the target to fall to closed position.

I have adverted to certain differences between the right and left units, including the different numbers of magnets 86 and coin tubes 141. The only change in construction necessary to adapt the left unit for operation by a clockwise turning movement of its finger piece 14 relates to the coin control lever itself. The coin control lever 176 of the left unit is, as will be seen from Fig. 13, oppositely disposed from the corresponding lever of the right unit. The leftwardly extending arm 177 of the lever 176 is provided with pins 178 for supporting the operating coin, which in this case being a dime requires that the pins shall be more closely spaced than in the right unit. The right hand arm 179 of the lever 176 is provided with a detent or pawl 180 for co-operation with the disc 107. This disc is a duplicate of the right hand disc, and the associated ratchet wheel 118 is also duplicated at the right. The lever arm 179 is also provided with a rounded portion 181 for riding over the face of the associate disc in correspondence with the pin 113 at the right.

The lever 176 pivots around the center 182 and rigid with the lever is an arm 183 whose inner face is shaped for proper cooperation with the associate boss 111.

The pawl 115 of the left unit is a duplicate of the corresponding pawl of the right unit but is differently located, as shown, in order properly to coact with the teeth of the associate ratchet wheel 118.

It will be seen that the two units, one a right hand and the other a left hand unit, are provided wtih means for adapting them for turning movements in the same direction by handles or finger pieces, both located at the outer margins of their associate units; and that the said means involves but slight changes, essentially requiring only the alteration of the coin control lever itself.

I claim:

1. In a machine of the class described, the combination of a coin-receiving chute arranged in a vertical plane and down which coins are adapted to roll on their rims, a true-coin passageway arranged in a vertical plane and in normal alignment with said chute and down which coins are adapted to roll, a false-coin passageway arranged in a vertical plane and normally out of alignment with said chute, arresting means for false coins operating in advance of said last recited passageway, a finger piece for operating the machine, and connections to said finger piece for moving said chute out of alignment with the true-coin passageway and into alignment with the false-coin passageway, said chute being maintained in a vertical plane in both its normal and abnormal positions.

2. In a machine of the class described, the combination of a coin chute, arresting means therein for arresting a false coin, a true-coin passageway in normal alignment with said chute, a false-coin passageway normally out of alignment with said chute, said chute and both of said passageways being disposed in a vertical plane, a finger piece for operating the machine, and connections operated by said finger piece for moving said chute out of alignment with the true-coin passageway and into alignment with the false-coin passageway and thereafter releasing any coin retained by said arresting means, said arresting means being maintained in constant relationship with said chute until after said chute had been moved into alignment with the false-coin passageway.

3. In a machine of the class described, the combination of a coin-receiving chute having relatively movable sides, and means for moving said chute as a whole to register with an ejecting slot and thereafter spreading its sides to release a defective coin so that it may enter said slot.

4. In a machine of the class described, the combination of a pivotally mounted coin-receiving chute comprising two walls spaced apart in a vertical plane and normally related to stop a false coin, another chute arranged in a vertical plane and with which the first recited chute is normally aligned, means for swinging said first recited chute about its pivot to throw it out of line with said other chute, the vertical plane relationship of the said two walls being maintained during such movement, and means for releasing coins from said first recited chute.

5. In a machine of the class described, the combination of a pivotally mounted coin-receiving chute arranged in a vertical plane and effected to arrest a false coin, a succeeding chute also arranged in a vertical plane with which the first recited chute is normally aligned, means for swinging said first recited chute about its pivot to throw it out of line with the succeeding chute and into alignment with an ejecting slot while at the same time maintaining its vertical arrangement and means operative on said first recited chute to relatively spread its walls apart in the vertical plane of the chute to afford ejection of a false coin through said slot.

6. In a machine of the class described, the combination of a pivotally mounted coin-receiving chute comprising two walls normally related to stop a false coin, a succeeding chute with which the first recited chute is normally alined, and means for swinging said first recited chute about its pivot to throw it out of line with the succeeding chute and into alinement with an ejecting slot, and means for relatively spreading said walls to release a false coin for ejection through said slot.

7. In a machine of the class described a hand piece in combination with locking devices for said machine, a pivotally mounted coin-receiving chute having relatively movable sides, connections between said hand piece and said locking devices and connections between said hand piece and said chute for swinging it on its pivot, and means for spreading the sides of said chute prior to the operation of the first recited connections to said locking devices.

8. In a machine of the class described, the combination of a pivotally mounted coin-receiving chute having relatively movable sides, a normally effective lock for said machine, a hand piece for the machine adapted to release said lock and connections between said hand piece and said chute for swinging it on its pivot, and means for spreading the sides of said chute while said lock still remains effective.

9. In a machine of the class described, the combination of a coin chute, means to insure the rolling movement of a coin through said chute, and a series of loose pins for arresting a false coin as it rolls through said chute.

10. In a machine of the class described, the combination of a coin chute, means to insure the rolling movement of a coin through said chute, and a series of loose pins for arresting a false coin as it rolls through said chute, and means for relatively spreading said pins and said first named means to release an arrested coin.

11. In a machine of the class described, the combination of an inclined coin chute, a channel bar arranged near the top of said chute and having its side walls provided with a series of vertical slots, and a series of pins loosely mounted in said slots and extending across the top portion of the chute and effective to coact successively with the rim portions of coins passing through said chute.

12. In a machine of the class described, the combination of an inclined coin chute, a channel bar arranged near the top of said chute and having its side walls provided with a series of vertical slots, and a series of pins loosely mounted in said slots and extending across the top portion of the chute and effective to coact successively with the rim portions of coins passing through said chute, said chute being provided with a serrated bottom portion to insure rolling movements of coins during their passage.

ANDREW M. ROBINSON.